Nov. 13, 1951  E. W. LIBBY  2,574,573
VIBRATION DAMPENER

Filed Dec. 9, 1949  2 SHEETS—SHEET 1

INVENTOR.
Edward W. Libby.
BY
Harness, Dickey & Pierce
ATTORNEYS.

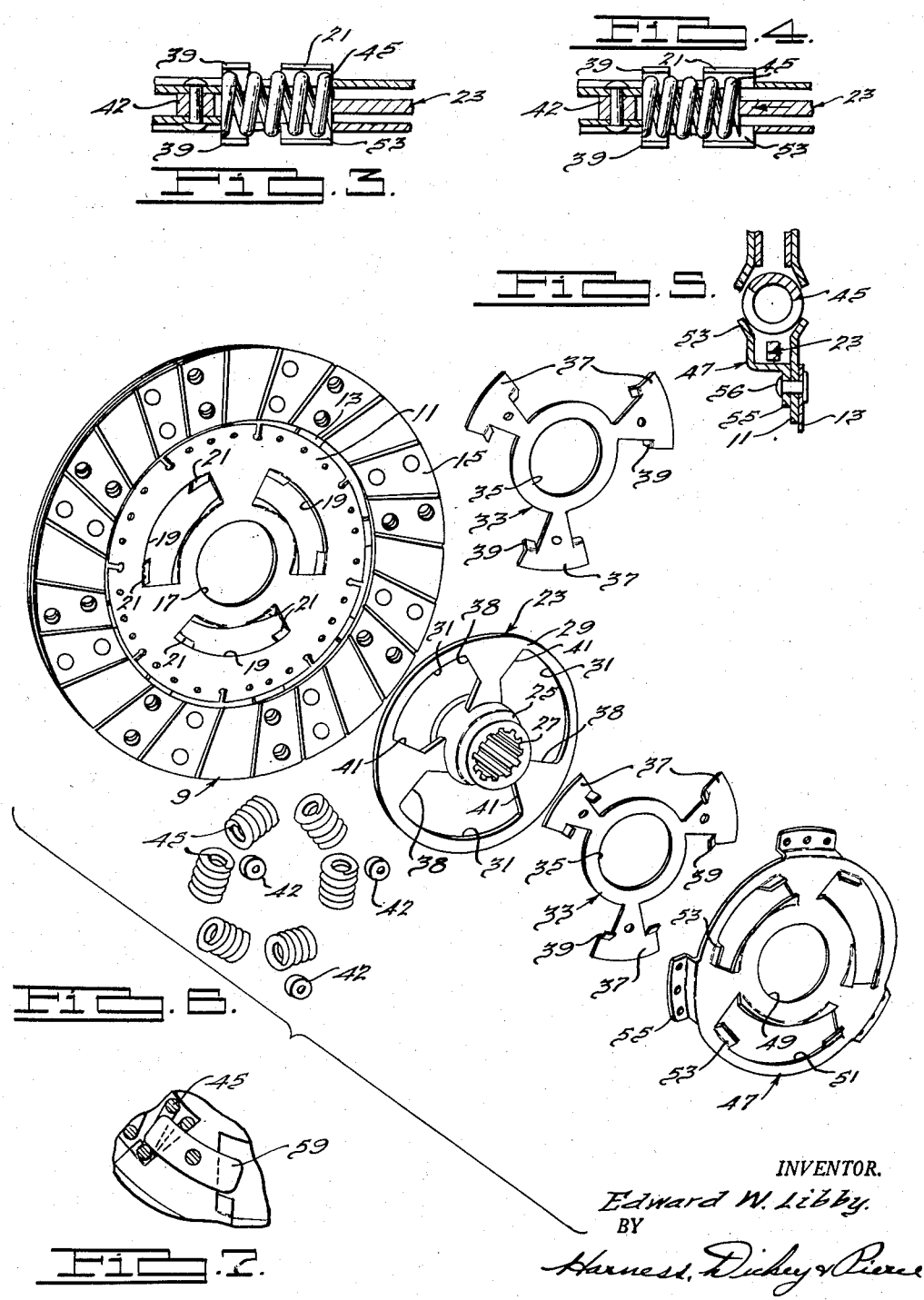

Patented Nov. 13, 1951

2,574,573

UNITED STATES PATENT OFFICE 2,574,573

VIBRATION DAMPENER

Edward W. Libby, Belleville, Mich., assignor to Kaiser-Frazer Corporation, Willow Run, Mich., a corporation of Nevada Application December 9, 1949, Serial No. 132,143

6 Claims. (Cl. 64—27)

This invention relates generally to friction clutches and more particularly to a vibration dampener construction for vehicle friction clutches, and is an improvement over the type of driven plate structure illustrated in U. S. Letters Patent No. 1,830,746, issued November 10, 1931, to Carl M. Ahlene et al., for Improvements in Driven Plates.

Dampeners of the aforementioned type generally embody a driven plate which is interposed between a driving member and a driven member such as between a vehicle engine flywheel and the transmission. In vibration dampeners of this type, springs are usually interposed between the driven friction plate and a hub member, which is connected with the vehicle transmission, in order to provide a torsional vibration cushion or dampener sufficiently yieldable to absorb torque pulsation originating from the engine or in the clutch due to chatter. In these clutches a plurality of relatively short, heavy coil springs are employed in parallel and the amount of deflection or windup between the hub member and friction plate member is limited by the amount of compressibility of any one of the individual springs. It has been found that this amount of deflection or windup is not always sufficient to take up vibrations and clutch chatter and to provide a smooth operating clutch. It is generally not possible to materially increase the length of the aforementioned coil springs because the same are disposed in a circumferential path and if the length were materially increased the springs would be circumferentially bent and would not properly operate.

The applicant has, however, devised a vibration dampener similar in general to the aforementioned type, but in which much greater torsional deflecting or windup is obtained by means of a novel arrangement of the short coil springs. It has been found that the increased angular deflection contributes materially toward the reduction of heretofore objectional drive line noises, such as encountered where heavy or rigid drive shafts are employed or where overdrives are used in combination with the transmission. Furthermore, it has also been found that the increased angular deflection has greatly improved the clutch engagement action by reducing the tendency for the clutch to chatter.

It is therefore an object of this invention to provide a vibration dampener of the aforementioned type, in which more deflection or windup between the hub member and driven friction plate is attained, so that when the friction clutch is engaging or is in engagement, the aforesaid advantages will be attained.

It is a further object of this invention to mount the aforementioned springs in the vibration dampener so as to insure their retention in place without affecting their freedom of movement and without causing excessive wear thereof.

It is a still further object of this invention to provide a vibration dampener of the aforementioned type, which is relatively inexpensive to manufacture, durable in use and more efficient in operation than any driven plate heretofore known.

These and other objects of this invention will become apparent from the following detailed description, taken in conjunction with the accompanying drawing, in which:

Fig. 3 is an enlarged sectional view of the structure illustrated in Fig. 1, taken along the line 3—3 thereof;

Fig. 4 is a sectional view, similar to Fig. 3, but illustrating the coil springs in a compressed position;

Fig. 5 is an enlarged sectional view of the structure illustrated in Fig. 1, taken along the line 5—5 thereof;

Fig. 6 is an exploded perspective view of the device of this invention; and

Fig. 7 is a fragmentary view, partially in section and partially in elevation, illustrating a further embodiment of the invention.

Figure 1:
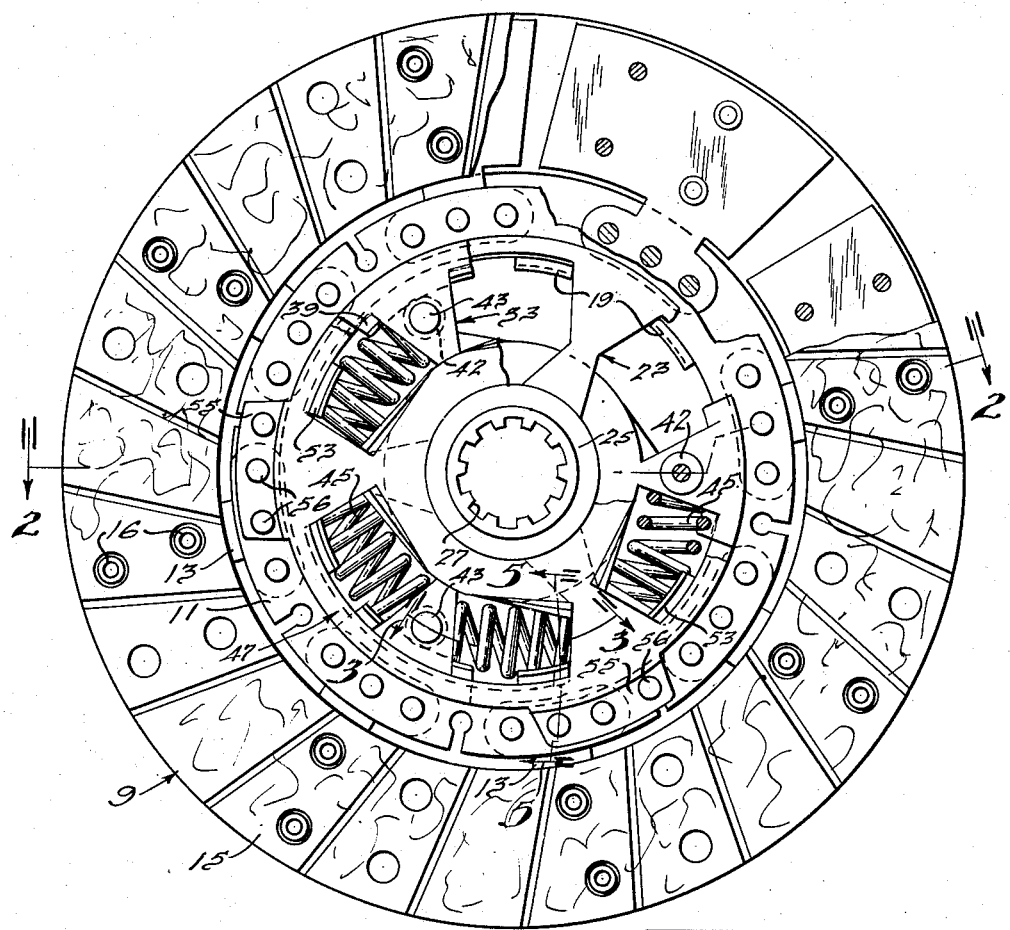
Figure 1 is a front view, partially in section and partially in elevation, with parts broken away for purposes of clarity, of the vibration dampener of this invention.
Figure 2:
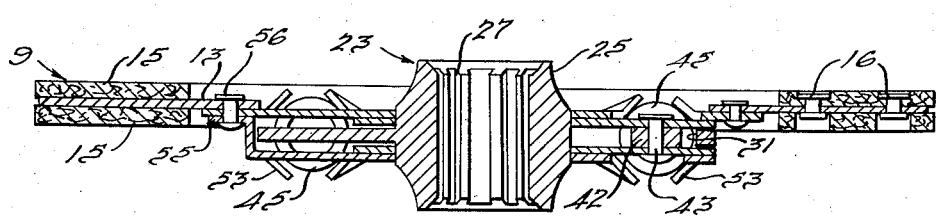
Fig. 2 is a sectional view of the structure illustrated in Fig. 1, taken along the line 2—2 thereof.

Referring now to the drawings, it will be seen that the vibration dampener includes a friction plate 9, comprising a central metallic plate 11 having a plurality of circumferentially spaced spokes or fingers 13 projecting radially outwardly from the outer periphery thereof, to which the back-to-back friction elements 15 are secured by any suitable means, such as rivets 16. The friction member plate 11 is provided with a central aperture 17 and a plurality of circumferentially spaced elongated openings 19 which are disposed radially outwardly of the central opening 17. Lips or tabs 21 are formed on the opposite longitudinal edges of the openings 19, and the tabs project over the opposite end portions of the openings, for reasons which will hereinafter appear.

A hub or plate member 23 is rotatably mounted on the friction member 9, and includes a hub 25 which is internally splined at 27 for engagement with a transmission drive shaft, or the like. A circumferential flange or plate 29 is secured to the hub 25 intermediate the opposite ends thereof, and is provided with a plurality of circumferentially spaced openings 31, which correspond with the friction plate openings 19 when the hub is inserted in the friction member central aperture 17. Side plate members 33, having a central opening or aperture 35, are sleeved on the hub 25 on opposite sides of the flange or plate 29. The plate members 33 are provided with circumferentially spaced, radially outwardly projecting spoke or finger portions 37, which overlie the hub member openings 31 substantially midway between the opposite ends 38 and 41 thereof. The spoke or finger portions 37 have outwardly bent tab portions 39 on the opposite side edges thereof adjacent their outer ends. The tab portions 39 of each of the plate members 33 extend over a portion of the openings 31, for a reason which will hereinafter appear. Spacers 42 are positioned between the opposed spoke or finger portions 37 of the members 33, within the confines of the hub member openings 31, and are connected with the spoke or finger portions 37 by any suitable means, such as rivets or bolts 43. The spacers 42 are of a thickness greater than that of the flange or plate 29, so as to properly space the plate members 33 and permit them to rotate relative to the hub member 23.

A pair of like, relatively short, heavy coil springs 45 are mounted in each hub member opening 31, and the coil springs are spaced by means of the plate finger or spoke portions 37. Therefore, one spring 45 in each opening 31 has one end abutting or adjacent to the opening end wall 41, and the other end abutting one end of a spoke portion 37. The other coil spring 45 in each opening 31 has one end abutting or adjacent to the opening end wall 38 and the opposite end abutting the opposite side of the spoke portion 37.

The hub member 23 with the springs 45 and plate members 33 connected therewith is rotatably mounted on the friction member 9 by inserting one end of the hub portion 25 through the friction member central opening 17. The openings 31 in the hub member correspond substantially with the friction member openings 19 so that when the hub member is positioned on the friction member one of the side plates 33 will engage one surface of the friction member central plate 11 and a portion of the coil springs will project into the friction member openings 19 and will be retained against accidental outward displacement in one direction from the friction and hub member openings by the tabs 21 and 39. In order to rotatably secure the hub member 23 with the friction member 9, a plate-like cage 47 is provided, which has a central opening 49 through which a portion of the hub 25 projects. The cage member 47 is provided with a plurality of circumferentially spaced openings 51, which correspond with the openings 19 in the friction member 9, and lips or tabs 53 are provided adjacent the openings 51 and project outwardly therefrom so as to cooperate with tabs 39 to prevent accidental outward displacement of the springs 45 in the opposite direction from the friction member tabs. The cage 47 is provided with circumferentially spaced, offset leg portions 55, which are secured to the central portion of the friction member 9 by any suitable means, such as rivets or bolts 56. It will be noted that when the structure is in assembled condition the outer ends of spokes or fingers 37 on both members 33 will be held in guided relation by the hub member 23, the friction plate 11 and the cage member 47. In particular, the outer ends of spokes 37 on one member 33 will be slidably supported between the friction plate 11 and hub flange 29, and the spokes on the other member 33 will be slidably supported between hub flange 29 and cage member 47.

In the embodiment of the invention illustrated in Fig. 7, the vibration dampener is identical to that previously described, except that in place of spacers 42 mounted between the spoke portions 37 of the side plate members 33 of the previous embodiment, an elongated finger-like plate element 59 is disposed between the spoke portions 37 of members 33 so that the opposite ends thereof project into the adjacent ends of the springs 45. With this construction, the tab portions 39 of the spokes 37 may be eliminated and the finger-like plate members 59 act both as a spacer for the side plate members 33 and as means for retaining the adjacent ends of the springs 45 against accidental displacement from the openings.

As the hub member 23 is free to turn relative to the friction member 9 and cage 47, and relative to the spoked plate members 33, the hub member is driven by the friction member through the springs 45. That is, when the friction member is rotated it will turn relative to the hub member until one spring 45 in each opening engages the aligned edges at one end of the cage and friction member openings 51 and 19, at which time the hub member will be driven by the friction member. In the event that there is resistance to turning of the hub member, the friction member will rotate and will compress the springs 45 against the edges of the hub member and cage member openings. A rigid driving connection between the hub member 23 and friction member 9 will not be obtained until both springs in each opening 31 have been fully compressed, at which time no more windup between the hub member and friction member can occur. Therefore, a spring deflection equal to twice that of each of the springs 45 (where both springs have the same construction), is obtainable with this construction because the springs are in effect connected in series, so that both springs can be compressed before a rigid driving connection is provided. Differently rated springs may be used in the pairs which would vary the dampening characteristics and provide a two stage deflection curve.

What is claimed is:

1. A vibration dampener for friction clutches, including a friction plate member having a plurality of elongated circumferentially spaced openings therein, a member mounted on said friction plate member for rotation relative thereto and having openings therein corresponding to and normally aligned with said friction plate openings, means including a plate element rotatably mounted on said rotatable member and having radially outwardly extending circumferentially spaced spokes extending over said aligned openings intermediate the ends thereof, resilient elements disposed between the opposite side edges of each of said spokes and the adjacent edges of said openings, so that at least a pair of said resilient elements are disposed in each of said aligned openings, and means retaining said resilient elements against accidental displacement from said openings, said means comprising a plurality of guard elements in adjacent non-gripping relation with said resilient elements, whereby when one of said members is rotated the other member will be driven through said springs and one of said members may rotate relative to the other of said members for a distance equal to the distance of compression of both of said resilient elements in each of said aligned openings.

2. A vibration dampener for friction clutches including a hub member having a flange, said flange having a plurality of elongated circumferentially spaced openings therein, a friction plate member rotatably supporting said hub member and having a plurality of openings corresponding to and normally aligned with said hub member openings, a pair of plate members sleeved on said hub member on opposite sides of said hub member flange, said plate members having circumferentially spaced, radially outwardly projecting spoke or finger portions extending over said aligned openings substantially midway between the opposite longitudinal ends thereof, means securing said plate members together in a spaced aligned relationship, a pair of coil springs disposed in each of said aligned openings, said springs being spaced by said plate member finger or spoke portions, and means retaining said coil springs against accidental displacement from said openings.

3. A vibration dampener for friction clutches including a hub member having a flange, said flange having a plurality of elongated circumferentially spaced openings therein, a friction plate member rotatably supporting said hub member and having a plurality of openings corresponding to and normally aligned with said hub member openings, a pair of plate members sleeved on said hub member on opposite sides of said hub member flange, said plate members having circumferentially spaced, radially outwardly projecting spoke or finger portions extending over said aligned openings substantially midway between the opposite longitudinal ends thereof, means securing said plate members together in a spaced aligned relationship, a cage member sleeved on said hub member over said plate members and secured with said friction plate member, said cage having a plurality of openings corresponding to and aligned with said friction plate member openings, a pair of coil springs disposed in each of said aligned openings, said springs being spaced by said plate member finger or spoke portions, and means retaining said coil springs against accidental displacement from said openings.

4. A vibration dampener for friction clutches including a hub member having a circumferential flange extending radially outwardly intermediate the opposite ends thereof, said flange having a plurality of elongated circumferentially spaced openings therein, a friction plate member having a central opening receiving at least a portion of said hub member and rotatably supporting said hub member, said friction plate member having a plurality of openings corresponding to and normally aligned with said hub member openings, a pair of plate elements sleeved on said hub member on opposite sides of said hub member flange and on one side of said friction plate member, said elements being rotatably supported on said hub member and having circumferentially spaced radially outwardly projecting spokes or fingers extending over said aligned openings substantially midway between the opposite ends of said openings, means securing said plate elements together in a spaced aligned relationship, a cage member sleeved on said hub member over said plate elements and secured with said friction plate member, said cage having a plurality of openings corresponding to and aligned with said friction plate member openings, a pair of coil springs disposed in said openings, said springs being spaced by said plate element fingers or spokes, and means on said cage, friction plate member and spokes or fingers retaining said coil springs against accidental displacement from said openings.

5. A vibration dampener for friction clutches including a friction plate having a plurality of elongated circumferentially spaced openings therein, a member mounted on said friction plate for rotation relative thereto and having openings therein corresponding to and normally aligned with said friction plate openings, a pair of plate elements rotatably mounted on opposite sides of said member and having radially outwardly extending circumferentially spaced spokes extending over said aligned openings substantially midway between the opposite longitudinal ends thereof, a cage member connected with said friction plate and rotatably supporting said member on said friction plate, said cage member having a plurality of spaced openings corresponding with said friction plate openings, a pair of coil springs disposed in each of said openings, said springs being spaced by said spokes so that each is disposed between one edge of a spoke and the adjacent end of its opening, an element connected between each pair of opposed spokes and having end portions projecting into the adjacent ends of the springs, and means on said friction plate and cage member, adjacent said openings, cooperating with said spring engaging elements to retain said springs against accidental displacement from said openings.

6. A vibration dampener for friction clutches comprising a hub member having a circumferential flange extending radially outwardly intermediate the opposite ends thereof, said flange having a plurality of elongated circumferentially spaced openings therein, a friction plate member having a central opening receiving at least a portion of said hub member and rotatably supporting said hub member, said friction plate member having a plurality of openings corresponding to and normally aligned with said hub member openings, a pair of plate elements sleeved on said hub member on opposite sides of said hub member flange and on one side of said friction plate member, said elements being rotatably supported on said hub member and having circumferentially spaced radially outwardly projecting spokes or fingers extending over said aligned openings substantially midway between the opposite ends of said openings, the outer ends of the spokes on one of said plate elements being slidably supported between said friction plate member and said hub member flanged, means securing said plate elements together in a spaced aligned relationship, a cage member sleeved on said hub member over said plate elements and secured with said friction plate member, the outer ends of the spokes on the other of said plate elements being slidably supported between said hub member flange and said cage member, a plurality of openings in said cage member corresponding to and aligned with said friction plate member openings, a pair of coil springs disposed in said openings, said springs being spaced by said plate elements fingers or spokes, and means retaining said coil springs against accidental displacement from said openings.

EDWARD W. LIBBY.

REFERENCES CITED

The following references are of record in the file of this patent:

UNITED STATES PATENTS

| Number | Name | Date |
|---|---|---|
| 937,291 | Eaton | Oct. 19, 1909 |
| 1,830,746 | Ahlene et al. | Nov. 10, 1931 |